United States Patent [19]

Healy et al.

[11] Patent Number: 4,543,985

[45] Date of Patent: Oct. 1, 1985

[54] PRESSURE REGULATOR

[75] Inventors: Mark Healy; Jerry D. Gerdes, both of Orlando, Fla.

[73] Assignee: Senniger Irrigation, Inc., Orlando, Fla.

[21] Appl. No.: 547,976

[22] Filed: Nov. 2, 1983

Related U.S. Application Data

[63] Continuation of Ser. No. 523,925, Aug. 17, 1983, abandoned.

[51] Int. Cl.[4] .............................................. F16K 31/12
[52] U.S. Cl. ........................... 137/505.25; 137/505.21
[58] Field of Search ..................... 137/505.25, 505.22, 137/505.21, 505.18

[56] References Cited

U.S. PATENT DOCUMENTS

| 2,950,739 | 8/1960 | Lofink | 92/95 |
| 2,997,059 | 8/1961 | Mortimer | 137/505.25 X |
| 3,103,230 | 9/1963 | Kustsche | 137/505.25 X |
| 3,664,369 | 5/1972 | Johnson | 137/484.4 |
| 3,890,999 | 6/1975 | Moskow | 137/505.25 |

FOREIGN PATENT DOCUMENTS 2910046  11/1979  Fed. Rep. of Germany ........................ 137/505.25

Primary Examiner—Harold W. Weakley
Attorney, Agent, or Firm—William M. Hobby, III

[57] ABSTRACT

A fluid pressure regulator for adjusting the pressure of fluid passing through a pipe is provided for use with irrigation sprinklers or the like. The pressure regulator has a housing having a passageway therethrough, which has a throttling stem slidably mounted in the housing passageway and having a passageway therethrough. A compression spring is mounted between the throttling stem and the housing to bias the throttling stem relative to the housing. A throttling stem seat is attached in the passageway through the housing and has a passageway therethrough and has the end of a throttling member extending thereinto for adjusting the passageway through the throttling member seat so that fluid pressure is adjusted between the input and output of the fluid pressure regulator. A throttling stem dampening member or pressure controller is mounted in the passageway to dampen oscillations in the throttling stem by limiting access of fluid to an annular chamber formed by the pressure controller, upper housing, throttling stem and diaphragm, to thereby dampen variations in fluid pressure against one end of the throttling stem.

5 Claims, 5 Drawing Figures

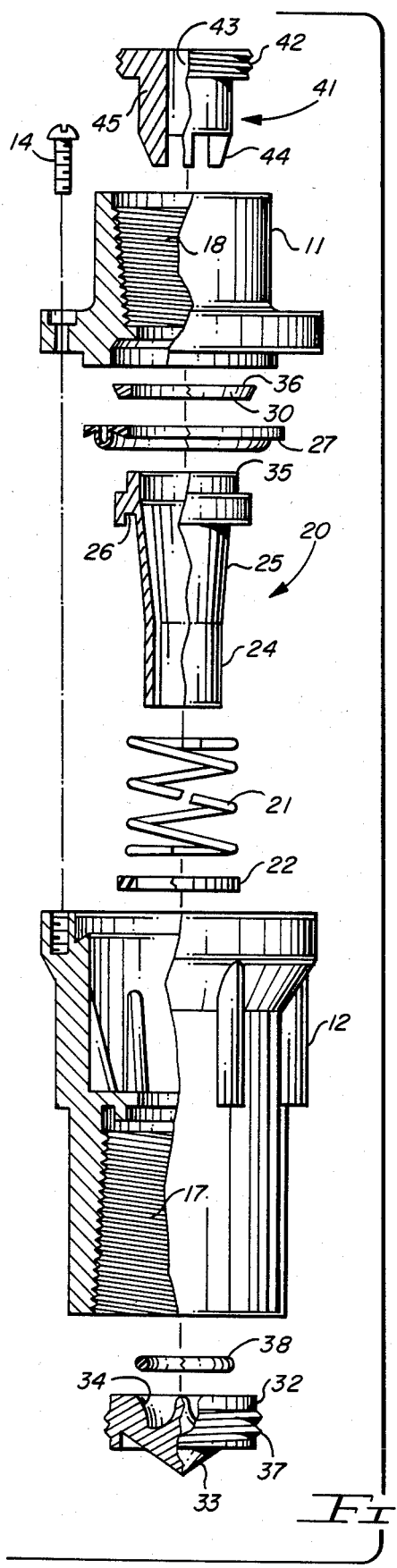
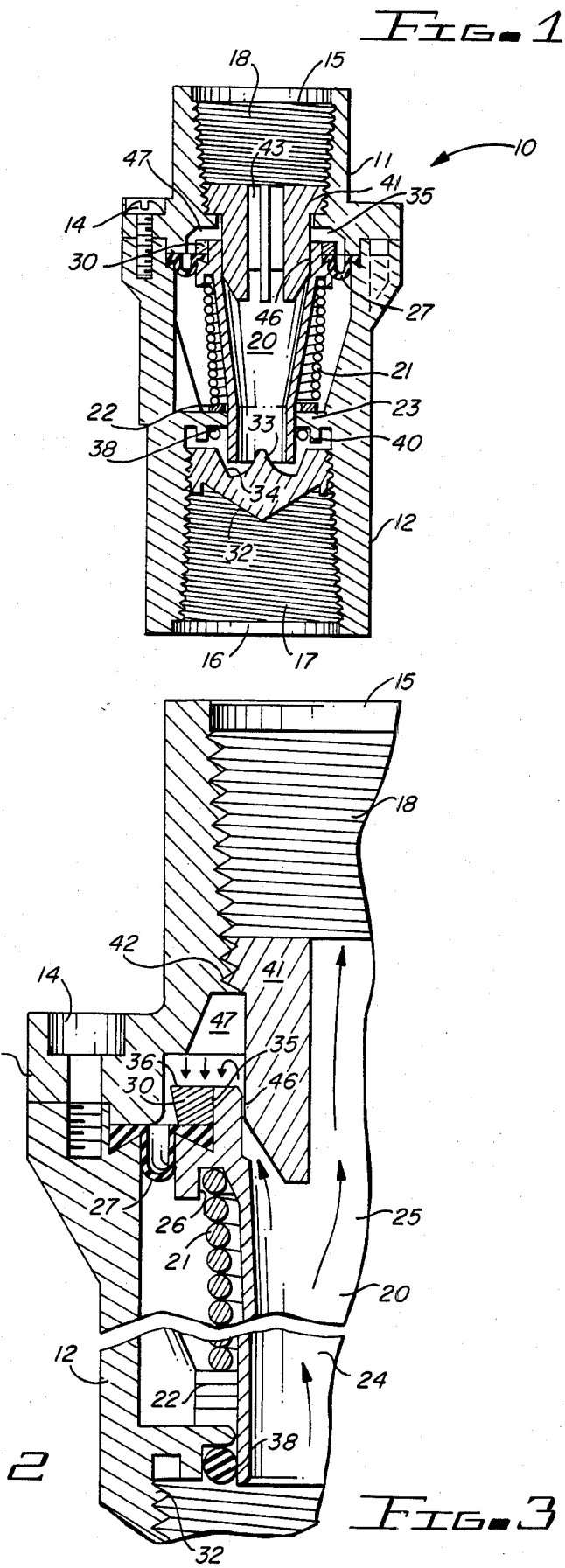
FIG.-1
FIG.-2
FIG.-3

PRESSURE REGULATOR

This application is a continuation of application Ser. No. 523,925, filed 8/17/83, now abandoned.

BACKGROUND OF THE INVENTION

The present invention relates to pressure regulators for irrigation sprinklers, or the like, and especially to a pressure regulator having a generally direct flow of fluid through the center thereof and has a pressure controller for dampening the oscillations in the pressure regulator and in the pressure of the fluid passing therethrough.

In sprinkler irrigation systems, water is received from a source of water under pressure and is introduced into a main water supply pipe, which is connected with one or more distributing pipes forming a fluid conduit. The irrigation system provides a plurality of discharged irrigation sprinkler heads which may be of many different types, such as seen in our prior U.S. Pat. Nos. 4,062,494, 3,204,873, 3,204,874, 4,130,247, 3,669,356 and 3,627,025. Water pressure throughout pipelines tend to vary for a variety of reasons and as the pressure varies between two sprinklers having discharge orifices of exactly the same size, so does the output flow. The quantity of water discharged over any given period of time varies in relation to the variations in pressure; thus causing uneven distribution of water from a sprinkler system with a greater amount of water being discharged through sprinklers where the pressure is higher and a lesser amount through sprinklers where the pressure is lower. To counter this problem, pressure regulators have been developed which can be attached in the water line ahead of the sprinkler head to maintain constant pressure at the sprinkler head for all the sprinkler heads in the irrigation system. There have been a great variety of fluid pressure regulators for regulating the flow of fluid through a pipe in irrigation systems. These pressure regulators typically rely on a spring biasing a piston or other member in a passageway for opening or closing a portion of the passageway. However, the passageways typically go around the piston and follow a circuituous passage.

Some of the prior pressure regulators have, however, provided a more direct path through the pressure regulator applying pressure to a biasing means which in turn affects the flow through the pressure regulator. Typical prior pressure regulators may be seen in the following U.S. patents: Burnett U.S. Pat. No. 614,441; Benz et al., U.S. Pat. No. 2,219,408; Semon U.S. Pat. No. 3,407,841; Hazlet U.S. Pat. No. 343,125; Evans U.S. Pat. No. 2,888,949; Byrd U.S. Pat. No. 3,930,519; Teague U.S. Pat. No. 4,281,681; Moskow U.S. Pat. No. 3,890,999; Eickmeyer U.S. Pat. No. 3,888,033; Zakay U.S. Pat. No. 4,023,595; Meronek U.S. Pat. No. 3,837,463; Inglis U.S. Pat. No. 3,053,641; and in a U.S.S.R. Pat. No. 325,596 to Danilenko.

The present pressure regulator is similar to some of those taught in the prior art, but advantageously overcomes one of the serious problems in sprinkler head pressure regulators by providing a means for dampening oscillations in a throttling stem and thereby dampening variation in the pressure of the fluid passing through the pressure regulator.

SUMMARY OF THE INVENTION

A fluid pressure regulator for adjusting the pressure of fluid passing through a pipe is provided for regulating pressure in an irrigation sprinkler head or the like. The pressure regulator has a housing having a passageway therethrough, along with a throttling stem slidably mounted in the passageway and having a passageway therethrough. A compression spring is mounted between the throttling stem and the housing to bias the throttling stem relative to the housing. A throttling stem seat is also attached in the passageway of the housing and has a passageway therethrough, and has the end portion of the throttling stem extending thereinto for adjusting the passageway through the throttling stem seat in accordance with movement of the throttling stem therein so that fluid pressure is adjusted between the input and output of the pressure regulator. A pressure controller is positioned in the housing for dampening oscillations in the throttling stem and in the pressure of the fluid passing through the pressure regulator. The pressure controller allows only limited access to an annular chamber and to the surface area on one end of the throttling stem, thereby dampening oscillation and other rapid movement of the throttling stem. Access of the fluid is limited by the pressure controller member extending into the throttling stem passageway on the end opposite the throttling stem seat in a manner to allow leakage of fluid therearound for applying pressure on the end surface of the throttling stem. The pressure controller can be threaded into one end of the housing and can have a smooth surface which will guide the movement of the throttle stem while allowing a limited access to a pressure chamber adjacent the end of the throttle stem in any position of the throttle stem.

BRIEF DESCRIPTION OF THE DRAWINGS

Other objects, features and advantages of the present invention will be apparent from the written description and the drawings, in which:

FIG. 1 is a sectional view of a pressure regulator in accordance with the present invention;

FIG. 2 is an exploded view of a pressure regulator in accordance with FIG. 1; and FIG. 3 is a partial sectional view of a pressure regulator in accordance with FIGS. 1 and 2.

DESCRIPTION OF THE PREFERRED EMBODIMENTS

Figure 4:
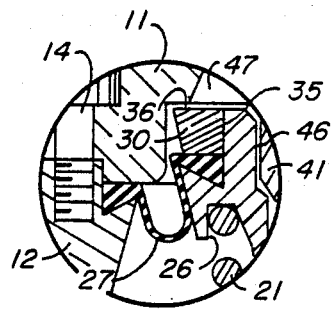
FIG. 4 is a partial sectional view taken through the diaphragm with the throttling stem in one position.

Referring to the drawings, a pressure regulator 10 is illustrated having an upper casing 11 and a lower casing 12. The upper and lower casings are held together with securing screws 14 to form the pressure regulator housing. A passageway 15 through the upper housing 11 and a passageway 16 through the lower housing 12 forms a complete passageway through the pressure regulator 10. The lower casing 12 has internal threads 17, while the upper casing 15 has internal threads 18 therein. A throttling stem 20 is slidably mounted in the passageway through the housing and rides on a compression spring 21, which in turn rides on a spring load adjusting washer 22 supported on a ledge 23 formed in the lower casing 12. The throttling stem 20 has a straight portion 24 and a truncated cone shaped portion 25, along with an annular spring holding groove 26 around the upper portion thereof. The compression spring 21 rides in the annular groove 26 on the throttle stem 20 which groove maintains the compression spring and the throttle stem together. An annular diaphragm 27 is compressed at 28 between the upper casing 11 and lower casing 12 and is attached to the throttling stem 20 by means of a holding ring 30. The diaphragm 27 both supports the throttling stem 20 and prevents the passage of fluid into an annular cavity 47 where the compression spring 21 is located.

A throttling stem seat 32 is threaded into the internal threads 17 of the lower casing 12 and has a passageway therethrough including a center portion 33 and edges 34, so that the sliding of the end portion 24 of the throttling stem 20 in and out of the seat 32 tends to partially shut off or open up the flow through the pressure regulator 10. The throttling stem 20 tends to shift against the compression spring 21 responsive to variations in the pressure of the fluid passing therethrough and applied against the throttling stem 20. The fluid pressure is applied against the angled surface 20, but especially against the top edge 35 of the throttle stem and against the top edge 36 of the holding ring 30 attached to the top of the throttling stem 20 and pressure may also be applied against the surface of the diaphragm 27. This pressure forces the throttling stem against the compression spring 21 and into the seat 32 to vary the flow and pressure through the pressure regulator. Seat 32 has threads 37 for threading into the threads 17. It is also provided with a lower O-ring seal 38 compressed by the seat against the ledge 23 and adjacent an annular surface 40.

The pressure regulator as described at this point operates in a similar manner to other pressure regulators for regulating the flow of fluid in sprinkler systems. However, one of the problems with the existing pressure regulators is that they tend to have throttling members that oscillate as the pressure varies and especially when there is a large inlet to outlet pressure ratio. This can cause damage to the system and uneven flow through the sprinklers. The present pressure regulator has the pressure controller 41 having external threads 42, which can be threaded into the internal threads 18 of the upper casing 11. The pressure controller 41 has a passageway 43 therethrough, along with protruding stream straightening vanes 44. When threaded into the upper casing 11, the pressure controller 41 advantageously has a close fit of its cylindrical outer wall 45 against the inner wall of the upper portion of the throttling stem 20. However, the fit is such to allow a very small flow through the annular spacing 46 between the surface 45 and the internal surface of the throttle stem 20. This allows a fluid to enter into the annular chamber 47 and to apply pressure against the top annular surface 35 of the throttle stem 20 and against the top 36 of the holding ring 30 and thereby against the throttling stem 20. The limited access to the chamber 47 dampens the rapid oscillations that are produced in most prior art pressure regulators producing a much smoother pressure control during pressure changes and thereby provides a substantial advantage over existing pressure regulators that have been used in the industry for many years.

FIG. 3 has arrows to show the flow of fluid and the application of pressure against the surfaces for controlling variations in the movement of the throttle stem 20. Inasmuch as the fluid in the chamber 47 has to flow in and out past the pressure controller, oscillations are damped in either direction of changes in pressure in the fluid.

Figure 5:
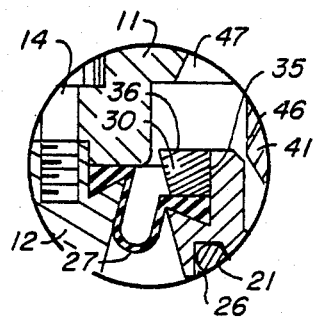
FIG. 5 is a partial sectional view in accordance with FIG. 4 having the throttling stem in a second position.

Turning to FIGS. 4 and 5, the throttling stem is illustrated in two positions showing the change of position of the diaphragm 27. The upper housing 11 is connected to the lower housing 12 by the securing screw 14 and compresses against one side of the diaphragm 27 to support the diaphragm thereto. The holding ring 30 holds the diaphragm other side onto the throttling stem, which has an annular groove 26 with a compression spring 21 supported therein. The throttling stem has a top edge 35 while the ring 30 has a top edge 36 to form a surface against which uniform pressure is applied. The edge of the pressure controller 41 can be seen in this view, along with the annular spacing 46. In operation, the spring 21 forces the throttling stem in one direction until the throttling stem is pushed by the pressure in the chamber 47 against the spring 21. As the pressure in the chamber 47 is increased, the throttling stem shifts from the position of FIG. 4 to the position as shown in FIG. 5. The diaphragm 27 shifts in a rolling fashion and provides a larger surface area for the pressure to be applied against the diaphragm in a downwardly direction thereby applying a greater force against the diaphragm for biasing the throttling stem against the spring 21. Inasmuch as the spring 21 is further compressed as the throttling stem moves, the pressure required for movement is increased. The shifting diaphragm produces an increased surface area which coincides with the increased pressure being applied by the partially compressed spring 21 to provide a smoother and more uniform pressure regulation.

It should be clear at this point that an improved pressure regulator has been provided, but the present invention is not to be construed as limited to the forms shown, which are to be considered illustrative rather than restrictive.

I claim:

1. A fluid pressure regulator for adjusting the fluid passing through a pipe comprising in combination:

a housing having a passageway therethrough;

a throttling stem slidably mounted in said housing passageway and having a passageway therethrough;

spring biasing means mounted between said throttling stem and the housing to bias said throttling stem relative to said housing;

a throttling stem seat attached in the passageway of said housing and having a passageway therethrough and having said throttling stem end portion extending thereinto for adjusting the passageway through said throttling stem seat to adjust fluid pressure between the input and output of said pressure regulator; and a pressure controller member mounted in said housing passageway and extending in one end of said throttling stem for dampening oscillations in said throttling stem by limiting access of fluid in said system to a chamber including a surface area on one end of said throttling stem, said pressure controller member forming an annular chamber between said housing and the top surface of said throttling stem and said pressure controller member and having a reduced passageway into said chamber from said passageway through said housing to thereby slow the flow of fluid into said chamber and dampen oscillations in said throttling stem, and in which said passageway into said chamber formed by said pressure controller member is an annular passageway between said pressure controller member and said internal surface of said throttling stem.

2. A fluid pressure regulator in accordance with claim 1, in which said throttling stem is supported by an annular diaphragm connected between said housing and is attached to said throttling stem with a holding ring which acts as a portion of the surface in said annular chamber formed by said pressure controller member.

3. A fluid pressure regulator in accordance with claim 1, in which said throttling stem is supported by an annular diaphragm connected between said housing and attached to said throttling stem, said annular diaphragm being shaped to increase the surface area perpendicular to the direction of the movement of said throttling stem as said throttling stem moves against said spring biasing means thereby increasing the pressure applied to moving said throttling stem.

4. A fluid pressure regulator for sprinklers, or the like, comprising in combination:

a housing having a passageway therethrough, said housing having internal threads formed on at least a portion of said passageway;

biasing means supported in said housing passageway;

pressaure adjustment means for varying the pressure of fluid passing through said housing said pressure adjustment means including a throttling stem and throttling stem seat, said athrottling stem having a passageway therethrough and being movably mounted to respond to the pressure difference in the fluid in said fluid regulator against the bias of said biasing means to thereby move into and out of said throttling stem seat to regulate the pressure of the fluid passing therethrough; and means to dampen oscillations in said pressure adjustment means throttling stem by limiting access of fluid passing through said fluid pressure regulator to an area adjacent one end of said throttling stem, said means to dampen oscillations in said pressure adjustment means including a pressure controller member mounted in said housing passageway having a portion thereof sliding in said throttling stem to form an annular cavity over the top of said throttling stem, and in which said pressure controller member allows the movement into and out of said annular cavity formed by said pressure controller member in said housing adjacent the top of said throttling stem, and in which said pressure controller member has an annular surface sliding in an annular surface in said throttling stem and allowing an annular space therearound for the ingress and egress of fluid into and out of said annular chamber formed adjacent the top of said throttling stem to reduce rapid changes in pressure in said annular chamber and rapid movements of said throttling stem.

5. A fluid pressure regulator in accordance with claim 4, including an annular diaphragm movably mounted between said housing and said throttling stem, said annular diaphragm being shaped to produce an enlarged surface area perpendicular to the direction of the movement of said throttling stem as said throttling stem moves against the biasing means responsive to pressure differences therein to thereby change the required pressure of a fluid passing therethrough for the movement of said throttling stem against said biasing means.

* * * * *